United States Patent
Pourbigharaz et al.

(10) Patent No.: US 7,929,648 B2
(45) Date of Patent: Apr. 19, 2011

(54) CLOCK ERROR DETECTION APPARATUS AND METHOD

(75) Inventors: Fariborz Pourbigharaz, Thornhill (CA); Milivoje Aleksic, Richmond Hill (CA); Carl Mizuyabu, Thornhill (CA); Aris Balatsos, Toronto (CA)

(73) Assignee: ATI Technologies Inc., Ontario (CA)

( * ) Notice: Subject to any disclaimer, the term of this patent is extended or adjusted under 35 U.S.C. 154(b) by 1113 days.

(21) Appl. No.: 11/278,221

(22) Filed: Mar. 31, 2006

(65) Prior Publication Data

US 2007/0230647 A1 Oct. 4, 2007

(51) Int. Cl.
*H04L 27/06* (2006.01)
(52) U.S. Cl. ....................................... 375/344
(58) Field of Classification Search .................. 375/344, 375/226
See application file for complete search history.

(56) References Cited

U.S. PATENT DOCUMENTS

| | | | | |
|---|---|---|---|---|
| 4,839,534 A | * | 6/1989 | Clasen | 327/144 |
| 5,602,812 A | * | 2/1997 | Miura et al. | 369/47.3 |
| 6,433,599 B2 | * | 8/2002 | Friedrich et al. | 327/165 |
| 6,993,104 B2 | * | 1/2006 | Morgan et al. | 375/355 |
| 2006/0212247 A1 | * | 9/2006 | Shimoyama et al. | 702/89 |
| 2007/0153949 A1 | * | 7/2007 | Chen et al. | 375/374 |

* cited by examiner

*Primary Examiner* — Kevin Y Kim
(74) *Attorney, Agent, or Firm* — Vedder Price, LLPC

(57) ABSTRACT

An error detection apparatus and method compares a first hardwired value such as a first clock threshold, and a second hardwired value such as a second clock threshold, and generates an indication that there is an error in a clock signal based on a comparison of the first hardwired value and the second hardwired value to the clock signal. If an error is detected, the error detection apparatus will, for example, interrupt clock recovery logic to take proper action for recovery of a clock generation circuit that generated the clock signal. The clock signal may be generated based on, for example, a reference clock signal that may be provided by an external source clock, or any other suitable source.

8 Claims, 7 Drawing Sheets

CLOCK ERROR DETECTION APPARATUS AND METHOD

FIELD OF THE INVENTION

The invention relates generally to clock error detection circuits and methods and more particularly to clock error detection and recovery circuits that can detect errors caused by electrostatic discharge or other causes of clock malfunction and recover therefrom.

BACKGROUND OF THE INVENTION

Electrostatic discharge (ESD) can cause a variety of problems in handheld devices such as cellular phones, camcorders, MP3 players, DVD players, or any other suitable portable device. Many such devices may incorporate multiple integrated circuits such as a main processor and various coprocessors. For example, cell phones that employ cameras may include, for example, multiple integrated circuits. By way of example, a graphics and multimedia coprocessor such as an Imageon™ sold by ATI Technologies Inc., 1 Commerce Valley Drive, Markham, Ontario, Canada, may be used with other suitable coprocessors or processors. High energy ESD pulses generated by the human body or other source can cause LCD panel images to get corrupted, flicker, freeze, fade, or cause other malfunctions in the apparatus when such coprocessors are effected by ESD events.

In the instance where the handheld device includes telephone circuitry, such as cell phone, ongoing calls can be dropped or the device may not respond to a user pressing keypads or activating another user interface. Susceptibility to electrostatic discharge damage can impact market capture and revenues generated by handheld device manufacturers. Therefore, ESD detection and recovery mechanisms have become increasingly important.

Clock generating circuits within a graphics and multimedia coprocessor, host processor, or any other integrated circuit in the device can play a central role in the proper functionality of the various integrated circuits and systems. Such clock generation circuits may include, but are not limited to, phase lock loop (PLL) clock generating circuits that can generate one or more output clock signals. For example, there may be multiple PLL circuits, such as one for audio, two or more for general system clock generation. These may in turn be increased or decreased in frequency by using suitable clock divider or clock multiplier circuits. Typically, an external source clock such as a crystal oscillator or any other suitable external source clock serves as a reference clock signal to the internal clock generation circuits. The clock generation circuits can generate multiple output clocks at different frequencies for different engines or circuits within a processor, for example. In the case of graphics and multimedia coprocessors, some internal engines may include, for example, a display engine that provides a pixel clock to the LCD display and outputs pixel information for display on the LCD display. Other engines may include a video imaging engine which is coupled to the camera to process the captured video image and provide it to the display engine for display. Also, 2D and 3D graphics engines, video processors, audio processors and other engines may also be incorporated as desired in such graphics and multimedia coprocessors, as known in the art. Since each of these engines, circuits or subsystems utilize one or more clocks for operation, the corruption of one or more of these clocks can cause the circuits and hence device to malfunction. For example, ESD corruption of phase lock loop locks and internal registers within a processor can result in the pixel clock not being present or other vital internal clocks not being locked to a particular frequency within a legitimate range.

Some known techniques for detecting clock malfunctions caused by ESD or other cause include, for example, a host processor such as a CPU that utilizes a software driver executing thereon to poll critical registers of critical operational blocks within a separate processor. For example, a status register of an external processor may be polled by the CPU via one or more suitable bus interfaces. Status bits such as phase lock loop clock enable bits can be monitored. If the bits show that the clocks have been disabled, the CPU determines that an ESD condition has occurred. However, such a system can be costly in handheld devices in terms of the power usage since the host processor needs to be used for the detection operation.

In addition, systems also typically rely on the host processor interface to also not be susceptible to this same ESD event that caused the problem in the coprocessor. To recover from the detected ESD event, the host processor typically updates the important registers with, for example, an image of the registers stored in system memory, or issues a software reset or a hardware reset to the corrupted subsystem.

In some systems, the system may also automatically update critical registers every few seconds with a stored backup of the information to provide an automatic recovery mechanism even though no error occurred. However, this can utilize unnecessary amounts of power when the device is battery powered. Also, such systems often do not provide any detection mechanism.

Another solution may be to have the host processor monitor external signals on a bus, for example, as opposed to looking at registers in the coprocessor and then generating a coprocessor reset when the CPU detects unexpected information on the external signals on the bus or other pin. Also, internal watchdog timer protocol monitors may be used to monitor information on top level buses. However, such systems will not detect all corruption cases since only a few of them would result in external pin state changes.

Accordingly, an improved error detection apparatus and/or recovery apparatus that overcame one or more the above drawbacks would be desirable.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, an error detection apparatus and method compares a first hardwired value, such as a first clock threshold, and a second hardwired value such as a second clock threshold, and generates an indication that there is an error in a clock signal based on a comparison of the first hardwired value and the second hardwired value to the clock signal. If an error is detected, the error detection apparatus will, for example, interrupt clock recovery logic to take proper action for recovery of a clock generation circuit that generated the clock signal. The clock signal may be generated based on, for example, a reference clock signal that may be provided by an external source clock, or any other suitable source.

In one embodiment, clock error detection logic effectively counts a number of output clock pulses (e.g., current count value) from a clock generation circuit during a given clock period and compares the current count value to two hardwired lower/upper boundary values in registers. One register contains a hardwired value that represents a lower boundary clock value and another register includes a hardwired value that represents an upper boundary clock value. The generated clock signal is within a suitable range at any given time when the system is functioning properly. The current count value is compared to the upper and lower boundary clock values that are hardwired. If the current count value in the temporary register is less than the hardwired lower boundary clock value or greater than the upper boundary clock value, the output clock of the clock generation circuit is determined to be invalid and an indication, such as an interrupt, is generated to indicate that there is an error in the generated clock signal. Multiple sets of hardwired lower boundary clock values and upper boundary clock values can be utilized for each PLL or clock generating circuit as desired.

Figure 1:
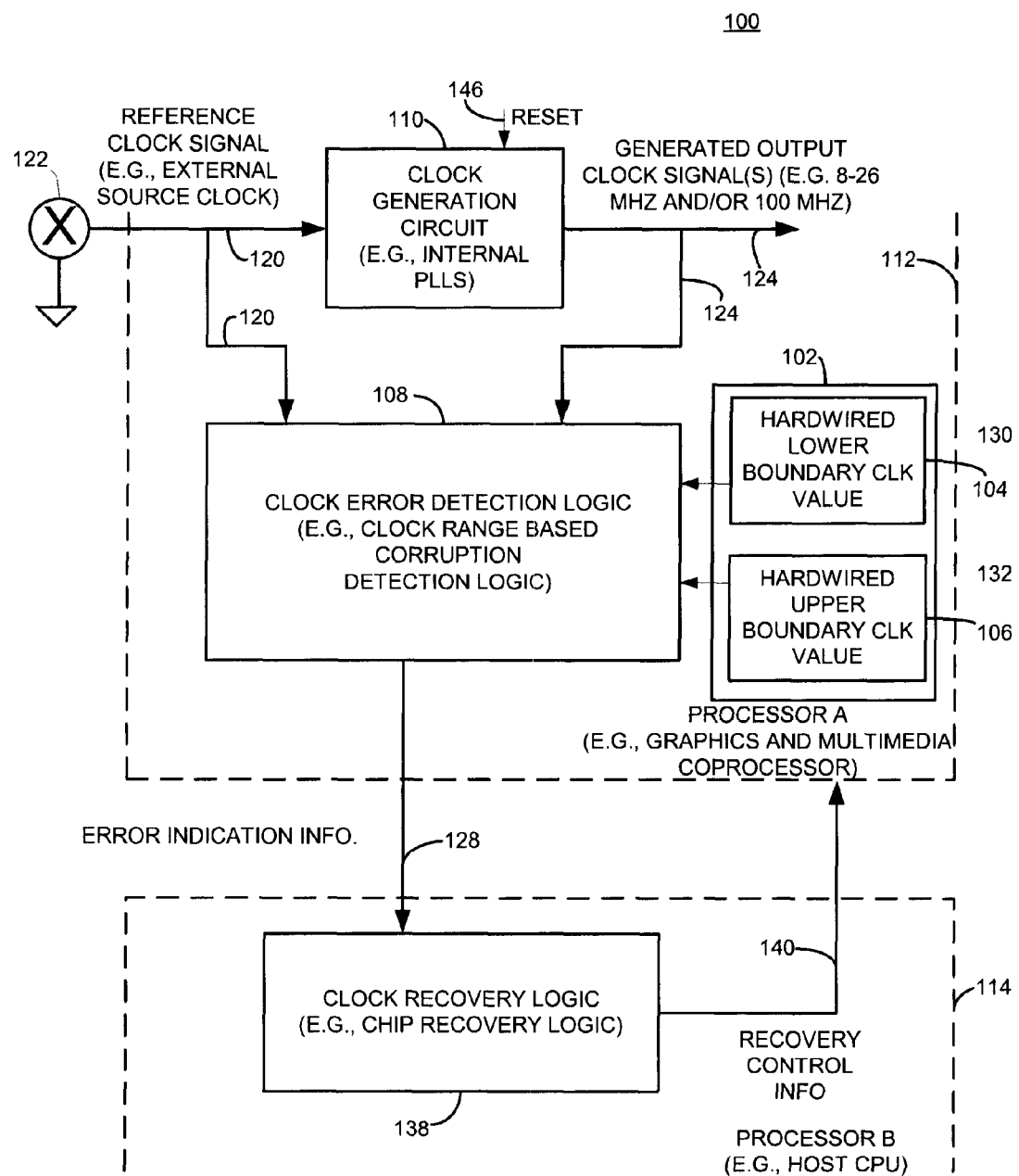
FIG. 1 is a block diagram illustrating one example of an error detection apparatus in accordance with one embodiment of the invention.

FIG. 1 illustrates one example of an error detection apparatus 100 that includes a circuit 102 that provides a first hardwired value 104 and a second hardwired value 106. The error detection apparatus 100 also includes clock error detection logic 108 that is operatively coupled to a clock generation circuit 110. In this example, the error detection apparatus 100 will be described as a handheld device, such as a cell phone, MP3 player, DVD player, or any other suitable device. However, it will be recognized that "apparatus" can also refer to an integrated circuit, a plurality of integrated circuits, or any other suitable structure may employ the functional blocks and operations described herein.

In this example, the error detection apparatus 100 is also shown to include a multi-processor structure with a first processor 112, such as a video graphics and multimedia coprocessor, and a second processor 114, such as a host processor or other suitable processor. It will be recognized that the processors may be on a same die, different die, in different packages, on different devices or any other suitable arrangement. It will be recognized that any suitable structure may be employed. The processor 112 receives an external source clock signal also referred to as a reference clock signal 120 from an external clock source 122 such as an oscillator shown in this example to be a 32 kilohertz (KHz) oscillator. However, any suitable clock source may be used. The clock generation circuit 110 may be one or more phase lock loops, as known in the art and produces a generated output clock 124 such as one or more output clock signals as known in the art. The generated output clock 124 is based on the reference clock signal 120. In this example, the generated output clock 124 may be, for example, one clock signal having a range of 8-26 megahertz (MHz). However, any suitable clock frequency signal may be produced depending upon the particular application.

Figure 6:
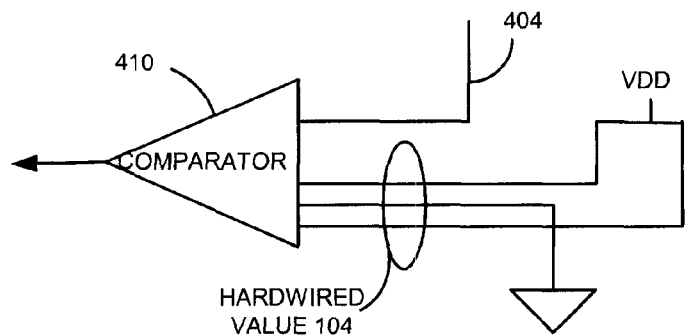
FIG. 6 is a diagram illustrating one example of a portion of an error detection apparatus in accordance with one embodiment of the invention.

The circuit 102 may be, for example, a register or registers that have the first and second hardwired values 104 and 106 whose bit values have been fused to a set value ("1" or "0") and hence are hardwired so that electrostatic discharge events do not corrupt the value contained in the circuit 102. Alternatively one could directly utilize power and ground signals (Vdd and GND) to provide a hardwired value for lower and/or upper boundaries (see e.g., FIG. 6). It will be recognized that any suitable structure may be used. The first hardwired value 104, in this example represents a first clock threshold and the second hardwired value 106 represents a second clock threshold. The first clock threshold is a hardwired lower boundary clock value 104 and the second hardwired value 106 is a hardwired upper boundary clock value. The clock error detection logic 108 compares the first hardwired value 104 and the second hardwired value 106 to the generated output clock 124 generated by the clock generation circuit 110 and generates data representing an indication 128 which indicates whether there is an error in the generated output clock signal 124. The clock error detection logic 108 may be implemented using any suitable structure including discrete logic or may be implemented as a software module executing on the processor 112. It will be recognized by one of ordinary skill in the art that any suitable structure may be used. Similarly, it will be recognized that any suitable hardwiring technique other than the fusing of bit levels may be employed as desired.

In this example, the circuit 102 includes a first hardwired register 130 that contains the first hardwired value 104 and a second hardwired register 132 that contains the second hardwired value 106. Also in this example, the processor 114 includes clock recovery logic 138 that is responsive to the indication 128 to attempt recovery of the clock generation circuit 110 that generated the output clock signal 124. As such, the clock recovery logic 138 generates recovery control information 140 such as a clock generation circuit reset signal, a processor 112 reset signal, or any other suitable information necessary to attempt clock recovery so that the generated output clock signal 124 is generated to be in a proper range.

The processors 112 and 114 are operatively coupled to one another through one or more suitable buses or other logic and the second processor 114 includes the client recovery logic 138 wherein the first processor 112 communicates the indication 128 to the second processor 114 which then attempts recovery of the entire first processor or sub-functional block of the first processor 112 such as the clock generation circuit 110. For example, as shown, the clock generation circuit 110 may include a reset input that in response to a reset signal 146, resets the clock generation circuit 110. It will be recognized that any other suitable technique may also be used. The generated output clock 124 is generated from, in this example, the external oscillator 122. However, it will be recognized that the reference signal may come from any other suitable source. It will be recognized that the processor 112 and processor 114 may be any suitable processing devices such as CPUs, DSPs, ASICs, microcontrollers, or any other suitable device that processes digital information.

Figure 2:
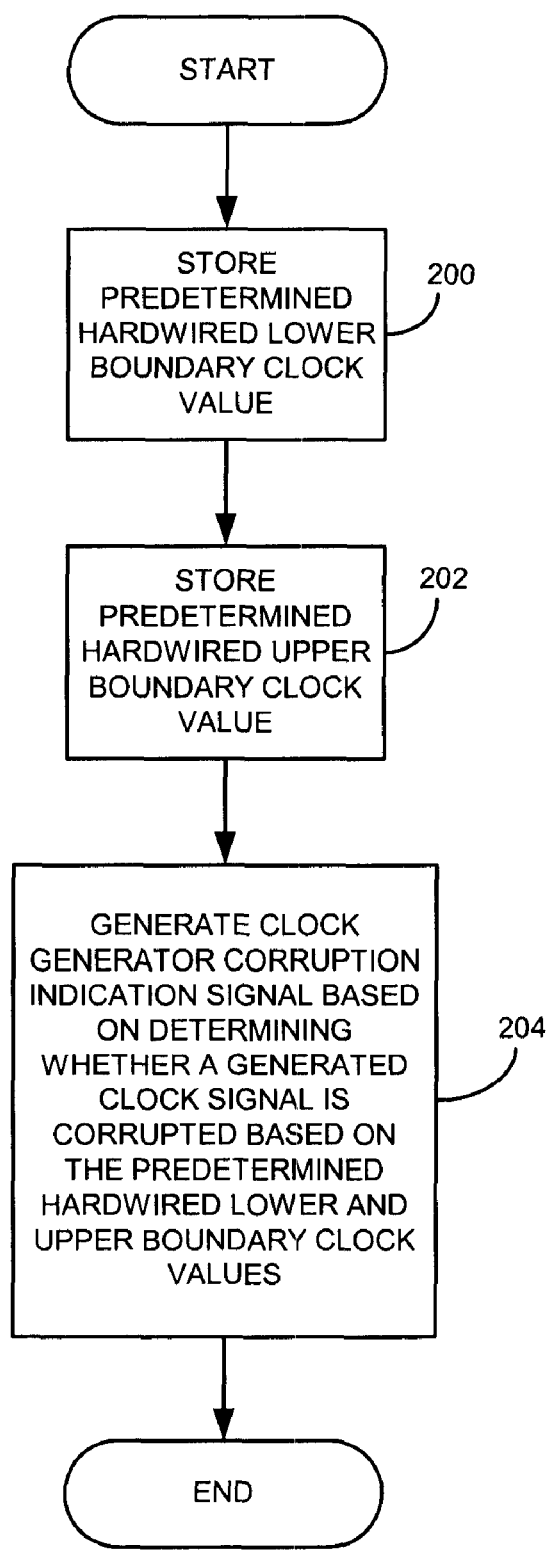
FIG. 2 is a flowchart illustrating one example of an error detection method in accordance with one embodiment of the invention.

FIG. 2 illustrates an error detection method that may be carried out, for example, by the clock error detection logic 108 and circuit 102. However, any suitable mechanism may be used. As shown in block 200, the method includes comparing the first hardwired value 104 and second hardwired value 106 to the clock signal 124 and as shown in block 202, generating the indication 128 that there is an error in the clock signal in response to the comparison.

Where the hardwired values are stored in registers, the method includes storing predetermined hardwired lower boundary clock value 104, such as accomplished by the circuit 102. This may be done, for example, when the processor 112 is manufactured and the generated output clock signal 124 frequencies and/or ranges are known. The bit value of the registers are fused by any conventional means to form a hardwired value. Similarly, the method includes, storing the predetermined hardwired upper boundary clock value. The also method includes generating the indication 128 based on a comparison of the generated output clock 124 with the first and second hardwired values.

The clock error detection logic 108 effectively counts and records, temporarily, the clock pulses during a desired clock period. For example, if the reference clock signal is 32 kilohertz and the generated output clock signal 124 can be in the range of 8-26 megahertz, the first hardwired value 104, in this example the hardwired lower boundary clock value is the ratio of 8 megahertz to 32 kilohertz. The second hardwired value 106, namely the hardwired upper boundary clock value 106 is the ratio of 26 megahertz to 32 kilohertz. As such, the generated output clock signal 124 during normal operation is somewhere within the range of 8-26 megahertz. The clock error detection logic 108 effectively counts the number of clock pulses during a 32 kilohertz clock period. It then compares the current counted value, such as stored in a temporary register, to the hardwired lower/upper bound registers. The temporary register is updated during the next 32 kilohertz clock period. The current count is then compared to the hardwired lower and upper bound register values. If the resulting temporary value is less than the lower bound or greater than the upper bound values it is determined that the generated output clock has been corrupted. If desired, the clock error detection logic 108 may also be suitably programmable to switch between multiple output clock signals 124 where multiple signals are generated so that the comparison logic may be shared among multiple output clock signals wherein each clock signal has corresponding hardwired registers that store the upper and lower boundary clock values.

In an alternative embodiment, dedicated clock error detection logic and corresponding hardwired registers 102 may be duplicated for each generated output clock signal 124. However, it may be desirable to share logic in order to reduce the space that the circuit requires in an integrated circuit.

Figure 3:
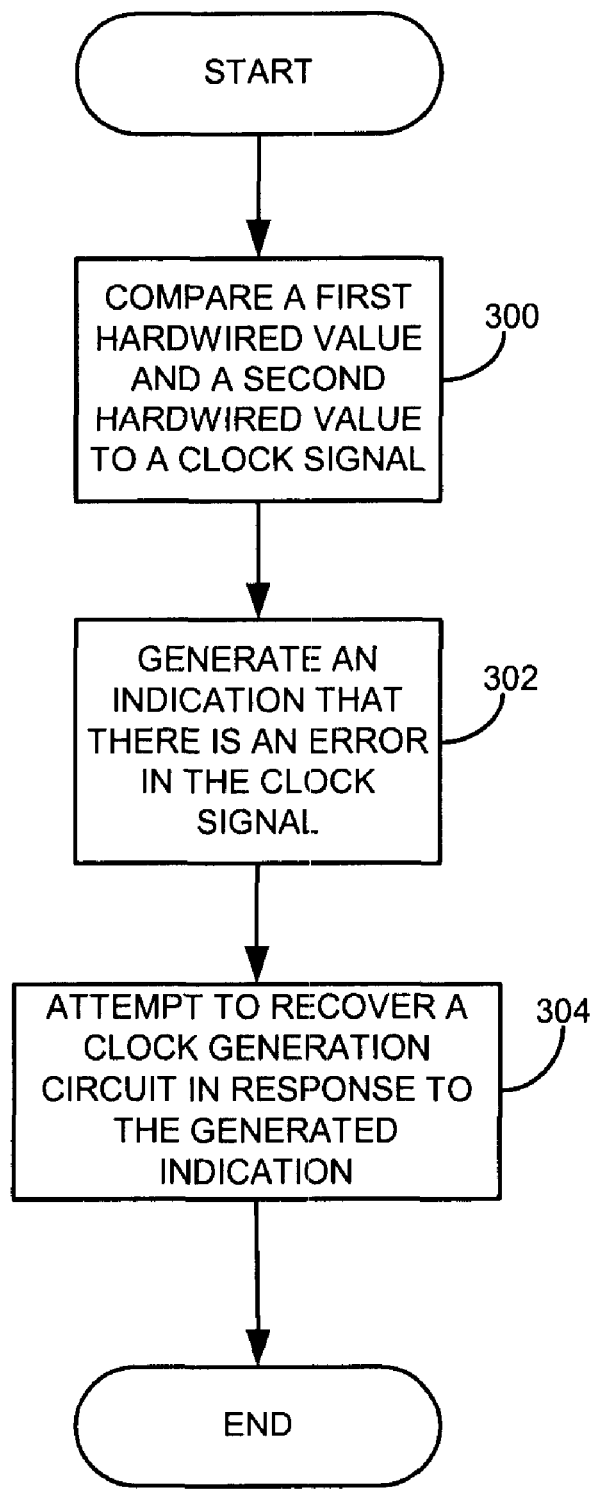
FIG. 3 is a flowchart illustrating one example of an error detection method in accordance with one embodiment of the invention.

FIG. 3 illustrates an error detection method that includes as shown in block 300, comparing the first hardwired value 104 and the second hardwired value 106 to the clock signal 124, such as by accumulating a number of clock pulses over a desired period of time and comparing the number of pulses to a hardwired lower boundary value and a hardwired upper boundary value. However, any other suitable technique may also be used. As shown in block 302, the method includes generating the indication 128 that there is an error in the generated output clock signal 124 such as when the accumulated number of clock pulses is outside of the boundary values. As shown in block 304, the method includes attempting to recover the clock generation circuit 110 in response to the generated indication 128, such as by the clock recovery logic 138 generating the recovery control information 140.

Figure 4:
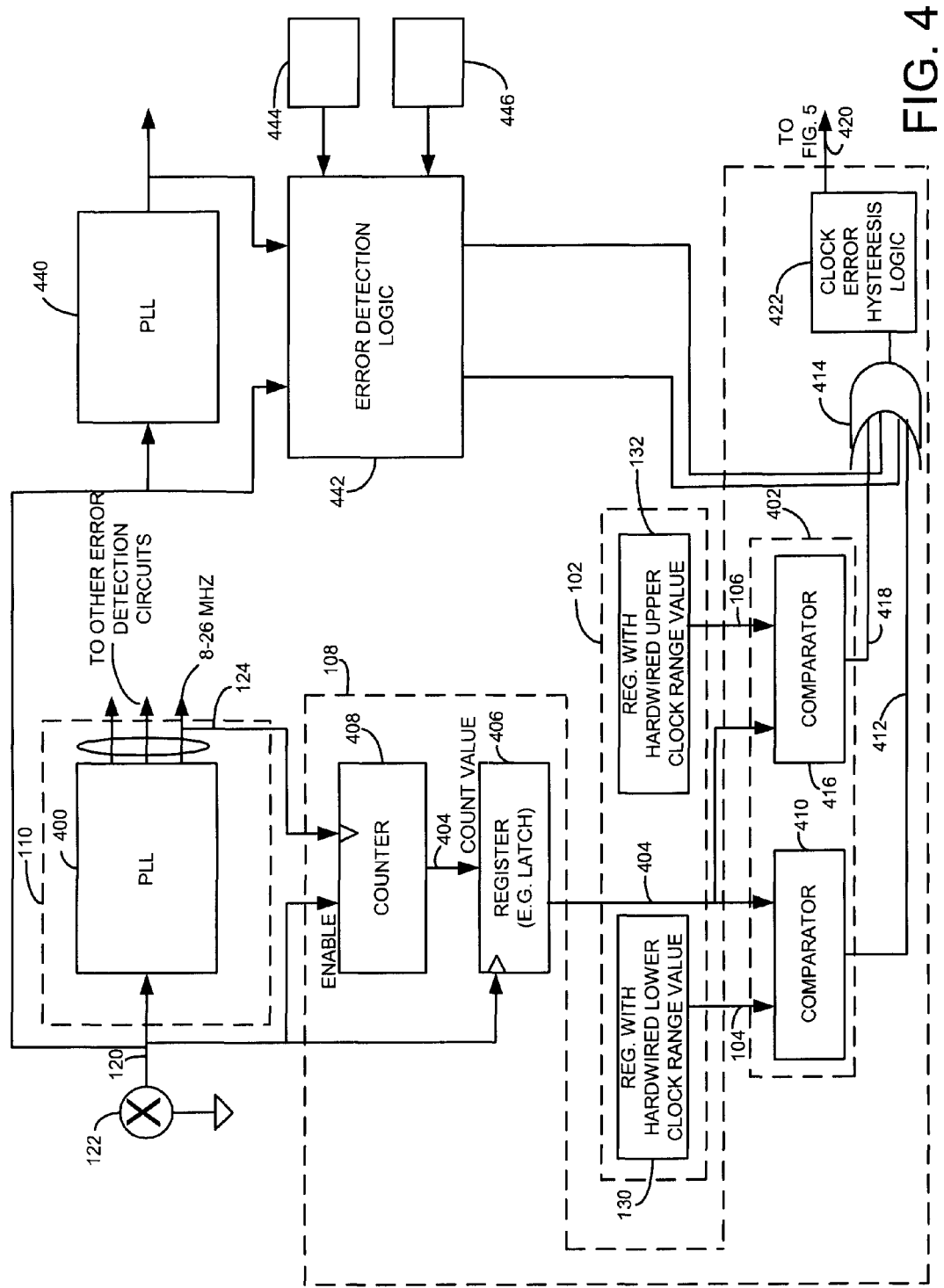
FIG. 4 is a block diagram illustrating one example of an error detection apparatus in accordance with one embodiment of the invention.
Figure 5:
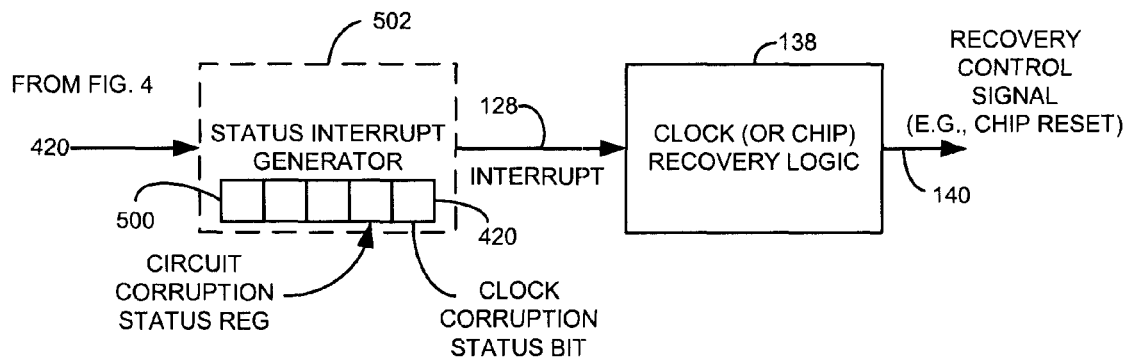
FIG. 5 is a block diagram illustrating one example of an error detection apparatus in accordance with one embodiment of the invention.

Referring to FIGS. 4 and 5, the block diagram illustrates in more detail an example of the clock generation circuit 110, clock error detection logic 108 and circuit 102. The clock generation circuit 110, in this example, includes one or more PLLs 400 that generate an output clock 124 or series of clock signals and for purposes of illustration only, will be described as outputting a clock signal in the range of 8-26 megahertz.

The clock error detection logic 108 includes a comparator 402 shown to include two comparator blocks, that compare the first hardwired value 104 stored in the hardwired register 130 and the second hardwired value 106 stored in hardwired register 132 to the count value 404 that is latched in temporary register 406. The count value 404 is based on the frequency of clock 124. The register 406 is a non-hardwired register that includes the current clock value 404 based on the related output clock 124. The clock error detection logic 108 includes also a counter 408 that utilizes the reference clock signal 120 as an enable input to begin counting pulses of output clock signal 124 during a 32 kilohertz clock period. The current count value 404 from the counter 408 is then latched into register 406 which also utilizes the reference clock signal 120 as an enable signal to load the count value 404 from the counter 408. The counter 408 is then cleared to count another series of pulses during the next 32 kilohertz period. The temporary count value 404 is then compared by comparator 402, using comparator logic 410, to the hardwired lower clock range value 104 and provides a comparison value 412 (e.g. one or more bits) indicating that the count is within an expected range or exceeds a desired range to the OR logic 414. Similarly, the temporary count value 404 is compared to the hardwired upper clock range value 106 via comparator logic 416 which provides a comparison value 418 to the OR logic 414. If either of the comparators 410 or 416 indicate that the temporary count value 404 is out of range of either the upper hardwired value or the hardwired lower clock range value, the output of the OR logic 414 is input into clock error hysteresis logic 422 which may be used if desired to accumulate comparator results from comparator 410 and 416 over a period of time so that intermittent corruption detection does not generate an indication 128. For example, the clock error hysteresis logic 422 repeatedly detects a clock signal error and generates the indication after a suitable number of detected clock signal errors, as opposed to a single clock error detection. If an actual error has been detected, a clock corruption status bit 420 is stored in a circuit corruption status register 500 which stores clock corruption status bits for each generated output clock signal from each desired PLL or from other circuit corruption logic in the processor 112, if it has other such logic. The circuit corruption status register 500 which includes the clock corruption status bit 420 is serviced by a status interrupt generator 502 which generates the error indication information 128, shown as an interrupt communicated to the clock recovery logic 138 which in turn attempts recovery of the clock generation circuit or entire chip or integrated circuit or subcircuit as desired by issuing an interrupt or reset signal.

As such, the clock generation circuit 110 in this example includes a phase lock loop circuit that receives the source clock signal 120 from the external clock source 122 and is operative to generate the clock signal 124 based on the source clock signal 120. It will be recognized that use of an external stable clock source that is relatively immune to ESD corruption is desirable.

FIG. 4 also illustrates an embodiment where multiple clock generation circuits 400 and 440 are employed and corresponding multiple clock error detection logic 108 and 442 and corresponding hardwired value circuits 130 and 132 and 444 and 446 are used to detect errors associated with the multiple clock generation circuits. The clock error detection logic and corresponding upper and lower boundary clock values may be duplicated for each PLL to check multiple PLLs in parallel and generate an interrupt, for example, if any of the PLLs are detected to have errors.

It will be recognized that when power reduction modes are used in the integrated circuit such as a normal operating power level, a reduced power level, a standby power level, and an off-power level, that the frequency of the clocks output by the clock generation circuits may be reduced and that the lower boundary clock values and the hardwired upper boundary clock values are chosen to take into account the full range of the PLL in the various power savings modes. Alternatively, different hardwired boundary clock values may be used and multiplexed accordingly for the clock error detection logic depending upon the power saving mode that the clock generating circuits are operating in (see e.g., FIG. 8).

Figure 7:
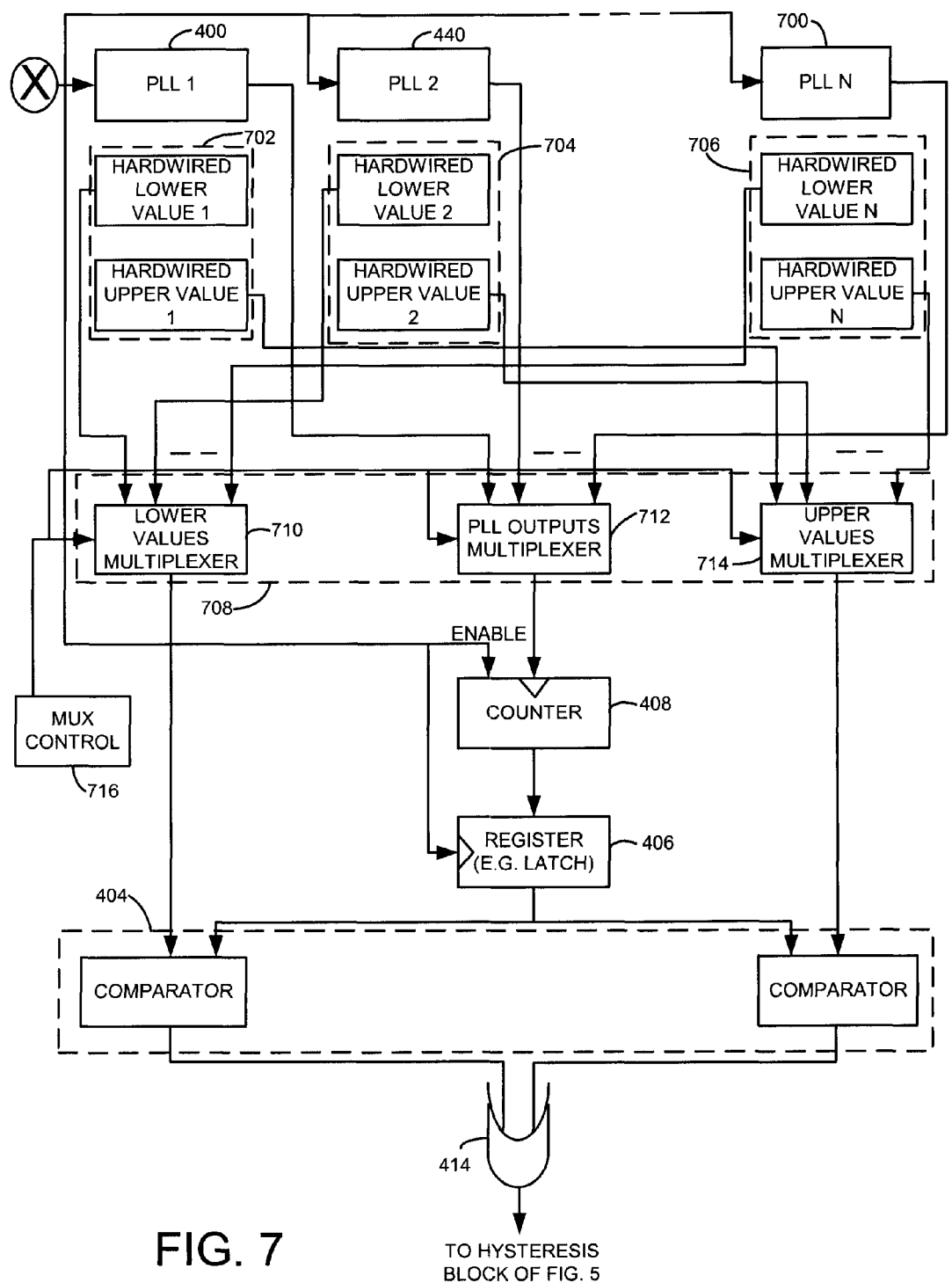
FIG. 7 is a block diagram illustrating one example of an error detection circuit employed for multiple clock sources that share some common circuitry in accordance with one embodiment of the invention.

FIG. 7 is a block diagram illustrating one example of a circuit for detecting an error that may be used for detecting errors for multiple clock generation circuits. In this example, the clock error detection logic is shared among clock generating circuits and pairs of hardwired lower boundary clock values and upper boundary clock values are employed for each respective clock generation circuit. Control logic such as a state machine, software executing on a processor, discrete logic or any other suitable logic may be used to control the shared counter to count output clocks of one of the plurality of clock generation circuits for a suitable period and latch the count value at the end of the period. Suitable switching logic may be used to multiplex the appropriate hardwired upper value and low values to shared comparator logic. At another point in time, a multiplexer is controlled to select the input and output clocks to another clock generation circuit and the counter is then enabled to count detected pulses for a time period associated with the frequency input to another PLL and a value is latched in the register and the appropriate upper and lower clock value ranges are then multiplexed in to the comparator logic. This may be done for any desired clock generation circuits.

As shown, error detection logic 408, 406 and 404 is shared for multiple clock generation circuits through the use of a multiplexing scheme. In this example, each of the plurality of clock generation circuits 400, 440 and 700 have corresponding hardwired upper and lower value circuits 702-706 that provide respective hardwired lower values and hardwired upper clock range values that represent clock thresholds. A switching logic 708 is operatively coupled to comparator logic 404 to output a selected hardwired upper and lower value from one of the plurality of circuits 702-706.

In this example, the switching logic 708 is shown as including a plurality of multiplexers 710, 712 and 714 wherein under control of switch control logic 716, multiplexer 710 multiplexes one of a plurality of hardwired lower clock range values to the comparator 404, multiplexer 712 multiplexes outputs clock signals from the clock generation circuits, and multiplexer 712 outputs one of a selected hardwired upper clock range values to the comparator 404. The switching logic 708 is controlled by switch control logic 716 which controls each multiplexer to output the corresponding hardwired value depending upon which clock generation circuit 400, 440 and 700 are being evaluated. Accordingly, the switch control logic 716 can sequentially cause the testing of each of the respective clock generation circuits by selecting the hardwired lower clock range value and corresponding hardwired upper clock range value from circuit 702 when testing the clock generation circuit 400. In this example, the counter 408, register 406 and comparator 404 is shared among the multiple clock generation circuits.

Figure 8:
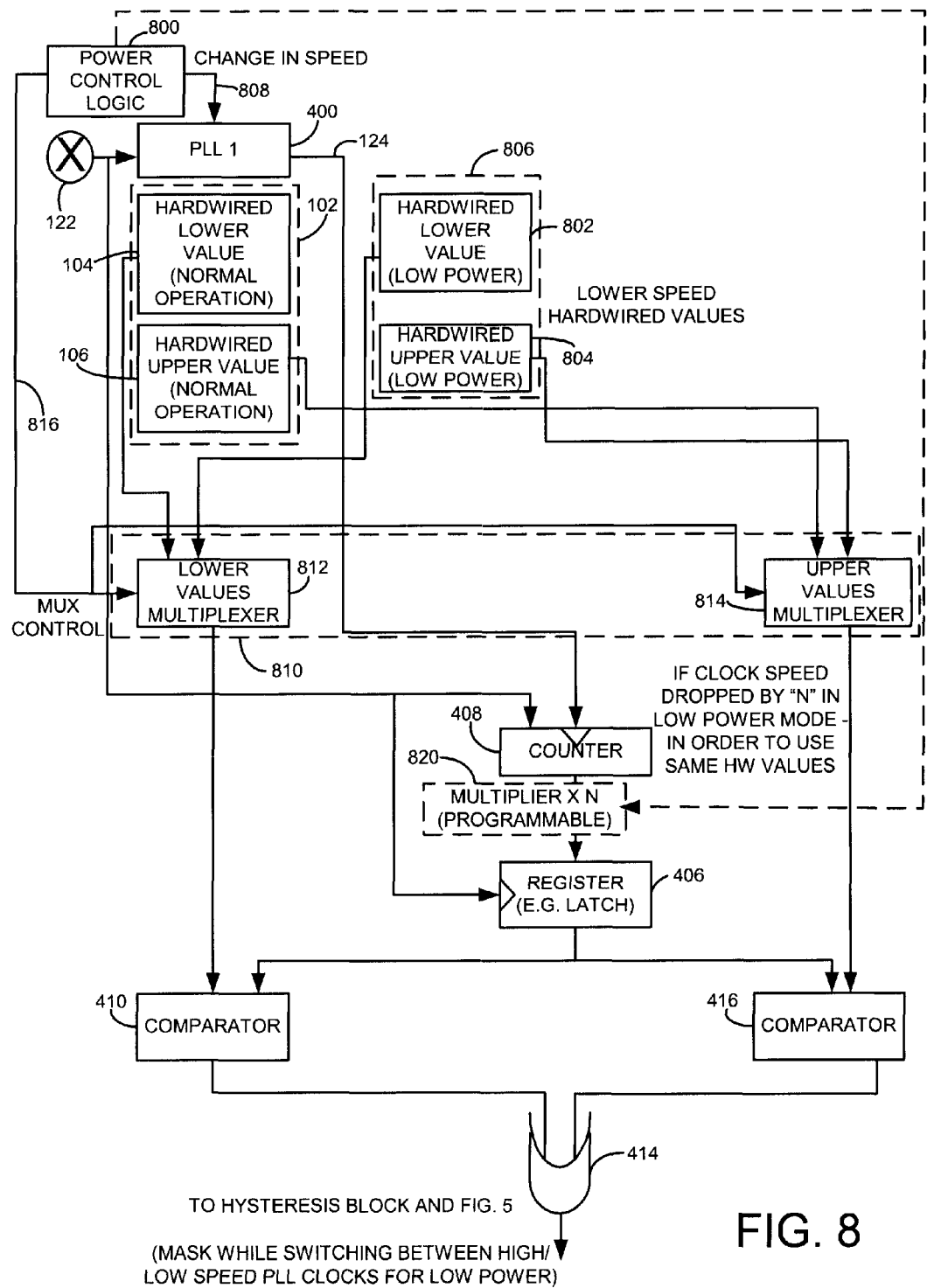
FIG. 8 is a block diagram illustrating one example of error detection logic utilized in connection with power savings control logic in accordance with one embodiment of the invention.

FIG. 8 illustrates another example of an error detection circuit used in a circuit, processor, system or subsystem, device or system that employs one or more power savings. For example, processors, memories, such as DRAMs, and other integrated circuits may employ power saving modes wherein a power supply level is reduced to reduce power consumption during certain periods and/or clock frequencies are reduced to reduce the power consumption of a portion of or entire integrated circuit. In this example, power control logic 800 controls the clock generation circuit 400 so that it outputs different clock output speeds depending upon the desired power savings level. For purposes of illustration only, a single power savings level (low power) will be described. However, it will be recognized that a continuous power reduction scheme may be used or multiple levels other than one power saving level may be employed. In this example, another set of hardwired upper clock range values and hardwired lower clock range values 802 and 804 are provided by another hardwired value circuit 706 similar to the circuits described above for the clock generating circuit 400. As such, when the power control logic 800 sends a power reduction signal 808 to the clock generation circuit 400, the output frequency is reduced and the hardwired lower value and hardwired upper value 802 and 804 are used to determine whether the lower frequency clock for power savings is within a desired range. When the clock generation circuit is operating in a non-power saving mode, the output frequency of the clock is at a higher frequency and the hardwired lower values and hardwired upper values 104 and 106 are used to determine whether the output clock is within the desired range.

Switching logic 810 such as a plurality of multiplexers 812 and 814 are used to select which set of hardwired upper and hardwired lower clock range values are to be used. The switching logic 810 is controlled via the power control logic 800 via a suitable multiplexer control signal 816 to select the appropriate hardwired upper clock range value and hardwired lower clock range value depending upon whether the clock generation circuit 400 is in a reduced power state or a normal power state, for example. As shown, shared hardware is used in this example in a power saving mode and a non-power saving mode. For example, comparators 410 and 416, register 406 and counter 408 are reused independent of whether the power control logic has changed the clock generation circuit to operate at a slower output frequency or at a higher output frequency. Accordingly, a set of hardwired lower and upper boundary values are provided for each clock generating circuit or PLL. The counter latch and comparator circuits may be shared between different PLLs to save logic and integrated circuit die area.

In an alternative embodiment, the hardwired lower value 802 and the hardwired upper value 804 are not needed. Instead, a multiplier circuit 820 may multiply the output of the counter 408 and provide the multiplied value to the register 406 wherein the multiplier multiplies by an amount to offset the reduction in output frequency caused when the clock generation circuit 400 is controlled to reduce its output frequency in a power savings mode. The multiplier may be programmable so that a large range of speed reduction frequencies may be employed. Other suitable structures may also be employed if desired.

The error detection circuit utilizes one or more clock generating circuits that are operative to vary a clock signal to a lower frequency when in a power savings mode. The circuit 102 or 806 circuit provides at least a set of hardwired values representing upper and lower clock thresholds associated with the clock generating circuit. The clock error detection logic compares the set of hardwired values to the clock signal and generates an indication of whether there is an error in the clock signal based on the comparison. Where both sets of hardwired values are used, each set corresponds to a different output clock frequency range. The set from circuit 806 corresponds to the lower frequency.

As described above in one example, the apparatus and method generates an output clock signal based on an externally generated source clock signal, and attempts to recover a clock generation circuit that generated the clock signal in response to an indication that there was an error in the clock signal. Where a level of hysteresis is desired, the method may include repeatedly detecting the clock signal error and generating the indication after a suitable number of detected clock signal errors. An indication that there is an error in the clock signal may include generating an interrupt for a processor. Among other advantages, the above apparatus and method utilizes hardwired values that are generally immune to ESD corruption and are used to detect a clock error condition, whether it is ultimately caused by electrostatic discharge events or other events, and generates an indication for suitable recovery logic to attempt recovery of a particular circuit or an entire processor or other system or subsystem if desired. Other advantages will be recognized by those of ordinary skill in the art.

It is therefore contemplated that the present invention cover any and all modifications, variations or equivalents that fall within the spirit and scope of the basic underlying principles disclosed above and claimed herein.

What is claimed is:

1. An error detection apparatus comprising:
a circuit providing a first hardwired value representing a first clock frequency threshold and a second hardwired value representing a second clock frequency threshold;
clock error detection logic operative to compare the first hardwired value and the second hardwired value to a clock signal and to generate an indication of whether there is an error in the clock signal based on the comparison: and
clock error hysteresis logic operative to repeatedly detect a clock signal error and generate the indication after a suitable number of detected clock signal errors.

2. An error detection apparatus comprising:
clock error detection logic operative to produce an indication of whether there is an error in a clock signal based on a first hardwired value representing a first clock frequency threshold and a second hardwired value representing a second clock frequency threshold; and
clock recovery logic operatively responsive to the indication to attempt recovery of a clock generation circuit that generated the clock signal
an external clock source;
a first processor, operatively coupled to the external clock source, that comprises the clock generation circuit and the clock error detection logic; and
a second processor operatively coupled to the first processor, that comprises the clock recovery logic,
wherein the first processor communicates the indication to the second processor and the second process is operatively responsive to the indication and generates recovery control information for the first processor,
the clock error detection logic comprises a phased locked loop circuit operatively coupled to receive a source clock signal from the external clock source and is operative to generate the clock signal based on the source clock signal, and
the clock error detection logic further comprises a first hardwired register comprising the first hardwired value and a second hardwired register comprising the second hardwired value and a first non-hardwired register comprising a current clock value based on the clock signal.

3. An error detection apparatus comprising:
clock error detection logic operative to produce an indication of whether there is an error in a clock signal based on a first hardwired value representing a first clock frequency threshold and a second hardwired value representing a second clock frequency threshold; and
clock recovery logic operatively responsive to the indication to attempt recovery of a clock generation circuit that generated the clock signal
an external clock source;
a first processor, operatively coupled to the external clock source, that comprises the clock generation circuit and the clock error detection logic; and
a second processor operatively coupled to the first processor, that comprises the clock recovery logic,
wherein the first processor communicates the indication to the second processor and the second process is operatively responsive to the indication and generates recovery control information for the first processor, and
the clock error detection logic comprises clock error hysteresis logic operative to repeatedly detect a clock signal error and generate the indication after a suitable number of detected clock signal errors.

4. A method for detecting an error comprising:
comparing a first hardwired value representing a first clock frequency threshold and a second hardwired value representing a second clock frequency threshold to a clock signal;
generating an indication that there is an error in the clock signal in response to the comparison; and
repeatedly detecting a clock signal error and generating the indication after a suitable number of detected clock signal errors.

5. A handheld device comprising:
a first processor that comprises:
a clock generation circuit operative to generate a clock signal,
a circuit providing a first hardwired value representing a first clock frequency threshold and a second hardwired value representing a second clock frequency threshold, wherein the circuit comprises a first hardwired register comprising the first hardwired value, a second hardwired register comprising the second hardwired value and a first non-hardwired register comprising a current clock value based on the clock signal;
clock error detection logic operative to compare the first hardwired value and the second hardwired value to the clock signal and to generate an indication of whether there is an error in the clock signal based on the comparison; and
a second processor, operatively coupled to the first processor, that comprises clock recovery logic operatively responsive to the indication to attempt recovery of the first processor in response to the indication.

6. An error detection apparatus comprising:

a first circuit associated with a first clock generation circuit providing a first hardwired value representing a first clock frequency threshold and a second hardwired value representing a second clock frequency threshold;

a second circuit associated with a second clock generation circuit providing a third hardwired value representing a third clock frequency threshold and a fourth hardwired value representing a fourth clock frequency threshold;

clock error detection logic, shared with the first and second circuits, operative to compare the first hardwired value and the second hardwired value to a clock signal to generate an indication of whether there is an error in the clock signal based on the comparison, and operative to compare the third hardwired value and fourth hardwired value to a clock signal to generate an indication of whether there is an error in the clock signal based on the comparison; and switching logic operatively controlled to select sets of hardwired values associated with a respective clock generation circuit;

wherein clock error detection logic is operatively coupled to the switching logic to determine whether an error has occurred among a plurality of clock generating circuits.

7. An error detection apparatus comprising:

a circuit providing a set of first hardwired values representing first and second clock thresholds associated with a clock generation circuit operating at a first power mode;

a circuit providing a second set of hardwired values representing third and fourth clock thresholds wherein the third and fourth clock thresholds are associated with a lower clock frequency associated with the clock generating circuit when the clock generating circuit is in a power reduction mode;

switching logic operative to select either the first and second hardwired values or the third and fourth hardwired values depending upon a power savings mode of the clock generating circuit; and clock error detection logic operatively coupled to the switching logic that compares the selected hardwired values to a clock signal provided by the clock generation circuit and to generate an indication of whether there is an error in the clock signal based on the comparison.

8. An error detection apparatus comprising:

at least one clock generating circuit operative to vary a clock signal to a lower frequency when in a power savings mode;

a circuit providing at least a set of hardwired values representing upper and lower clock thresholds associated with the clock generating circuit, comprising providing at least two sets of hardwired values, wherein each set corresponds to a different output clock frequency range and at least one of the sets of hardwired values corresponds to the lower frequency; and clock error detection logic operative to compare the set of hardwired values to the clock signal and to generate an indication of whether there is an error in the clock signal based on the comparison.

* * * * *